US010394816B2

United States Patent
Datta

(10) Patent No.: US 10,394,816 B2
(45) Date of Patent: Aug. 27, 2019

(54) DETECTING PRODUCT LINES WITHIN PRODUCT SEARCH QUERIES

(71) Applicant: Ritendra Datta, Pittsburgh, PA (US)

(72) Inventor: Ritendra Datta, Pittsburgh, PA (US)

(73) Assignee: GOOGLE LLC, Mountain View, CA (US)

( * ) Notice: Subject to any disclaimer, the term of this patent is extended or adjusted under 35 U.S.C. 154(b) by 342 days.

(21) Appl. No.: 13/728,720

(22) Filed: Dec. 27, 2012

(65) Prior Publication Data

US 2014/0188934 A1 Jul. 3, 2014

(51) Int. Cl.
*G06F 16/2455* (2019.01)

(52) U.S. Cl.
CPC .............................. *G06F 16/24553* (2019.01)

(58) Field of Classification Search
CPC ......... G06F 17/30483; G06F 17/30734; G06F 17/3089; G06F 16/24553; G06F 16/367; G06F 16/958
USPC ................................................. 707/771, 769
See application file for complete search history.

(56) References Cited

U.S. PATENT DOCUMENTS

| | | | |
|---|---|---|---|
| 5,442,780 A | 8/1995 | Takanashi et al. | |
| 5,634,051 A | 5/1997 | Thomson | |
| 6,652,283 B1 * | 11/2003 | Van Schaack | G09B 5/00 434/236 |
| 7,421,725 B2 | 9/2008 | Hane et al. | |
| 7,689,540 B2 * | 3/2010 | Chowdhury | G06F 17/30648 702/182 |
| 7,814,085 B1 | 10/2010 | Pfleger et al. | |
| 8,117,071 B1 * | 2/2012 | Fitch et al. | 705/23 |

(Continued)

FOREIGN PATENT DOCUMENTS

| | | |
|---|---|---|
| WO | 2014/078641 A1 | 5/2014 |
| WO | 2014/106037 A1 | 7/2014 |
| WO | 2014/078641 A8 | 8/2014 |

OTHER PUBLICATIONS

Author: Title: Internet Article: eBay: Turbo Lister FAQ—Seller Tools retrieved from http://pages.ebay.com/turbolister Publ: http://pages.ebay.com/turbolister2/faq.html vol/Iss: pp. 1-4 Date: Nov. 30, 2010.

(Continued)

*Primary Examiner* — James Trujillo
*Assistant Examiner* — Fariborz Khoshnoodi
(74) *Attorney, Agent, or Firm* — Johnson, Marcou & Isaacs, LLC

(57) ABSTRACT

Systems and methods can determine product lines product searches. One or more computing devices can receive a product query of search terms. The product query may be classified to identify a product category. A brand may be identified for the product query. The brand may be selected from a list of known brands for the product category. One or more unknown product line terms may be identified within the product query. A metric may be computed to indicate how well the unknown product line terms correspond to an actual product line within the brand. The metric may be compared to a specified threshold. The unknown product line terms may be designated as a new product line of the brand if the metric favorably compares to the specified threshold. A product search may be performed on the product query. Product search results may be returned according to the product search.

20 Claims, 4 Drawing Sheets

(56) References Cited

U.S. PATENT DOCUMENTS

| | | | |
|---|---|---|---|
| 8,612,306 B1 | 12/2013 | Mukherjee et al. | |
| 8,718,369 B1* | 5/2014 | Tompkins et al. | 382/181 |
| 8,781,916 B1 | 7/2014 | Buryak | |
| 9,110,984 B1 | 8/2015 | Lewis et al. | |
| 9,177,059 B2* | 11/2015 | Musgrove | G06F 17/30864 |
| 2002/0138297 A1* | 9/2002 | Lee | 705/1 |
| 2002/0157096 A1 | 10/2002 | Hane et al. | |
| 2003/0129574 A1* | 7/2003 | Ferriol | G09B 5/00 434/362 |
| 2004/0054639 A1* | 3/2004 | Muno, Jr. | G06Q 50/22 |
| 2006/0059135 A1 | 3/2006 | Palmon et al. | |
| 2006/0064411 A1 | 3/2006 | Gross et al. | |
| 2006/0287986 A1 | 12/2006 | Westphal | |
| 2007/0005563 A1 | 1/2007 | Aravamudan et al. | |
| 2008/0015937 A1* | 1/2008 | Perkowski et al. | 705/14 |
| 2008/0126303 A1* | 5/2008 | Park | G06F 17/30817 |
| 2008/0140643 A1 | 6/2008 | Ismalon | |
| 2008/0208820 A1 | 8/2008 | Usey et al. | |
| 2008/0295133 A1 | 11/2008 | Pronk et al. | |
| 2009/0271390 A1 | 10/2009 | Zheng et al. | |
| 2009/0299853 A1 | 12/2009 | Jones et al. | |
| 2010/0205180 A1 | 8/2010 | Cooper et al. | |
| 2010/0262602 A1* | 10/2010 | Dumon | G06F 17/30979 707/728 |
| 2011/0029464 A1 | 2/2011 | Zhang et al. | |
| 2011/0078127 A1 | 3/2011 | Lin et al. | |
| 2011/0078128 A1 | 3/2011 | Lin et al. | |
| 2011/0078130 A1 | 3/2011 | Roizen et al. | |
| 2011/0145227 A1 | 6/2011 | Kenthapadi et al. | |
| 2011/0258049 A1* | 10/2011 | Ramer et al. | 705/14.66 |
| 2011/0295716 A1* | 12/2011 | Dumon et al. | 705/26.61 |
| 2012/0066253 A1 | 3/2012 | Osborn et al. | |
| 2012/0101918 A1 | 4/2012 | Battle et al. | |
| 2012/0197653 A1* | 8/2012 | Short et al. | 705/1.1 |
| 2012/0233154 A1 | 9/2012 | Walther et al. | |
| 2012/0259882 A1* | 10/2012 | Thakur | G06F 17/30873 707/767 |
| 2012/0265779 A1 | 10/2012 | Hsu et al. | |
| 2012/0296712 A1* | 11/2012 | Morris | G06Q 30/02 705/14.4 |
| 2013/0204713 A1* | 8/2013 | Snedeker | G06Q 30/0241 705/14.72 |
| 2014/0143254 A1 | 5/2014 | Datta et al. | |

OTHER PUBLICATIONS

Author: Title: Internet Article: eBay: Turbo Lister—Seller Tools—List Multiple Items and Upload to eBay in Bulk! Publ: http://pages.ebay.com/turbo_lister vol/Iss: pp. 1-2 Date: Nov. 30, 2010.

Author: Title: eBay—Turbo Lister Listing Activity Quick Start Guide Publ: eBay File Exchange Catalog Listing Template Instructions vol./Iss:Ver. 1.1 pp. 1-8 Date: Apr. 1, 2007.

Author: Liu et al. Title: Clustering Billions of Images with Large Scale Nearest Neighbor Search Publ: IEEE Workshop on Applications of Computer Vision (WACV'07) vol/Iss: pp. 1-6 Date: Jan. 1, 2007.

Author: Civan, Ethan D. Title: Office Action issued in copending U.S. Appl. No. 13/475,083, filed May 18, 2012 vol/Iss: pp. 1-9 dated Aug. 28, 2013.

U.S. Appl. No. 13/680,005 to Datta et al. filed Nov. 16, 2012.
U.S. Appl. No. 13/600,194 to Shetti et al. filed Aug. 30, 2012.

Author: Byun, S. C. Title: International Search Report and Written Opinion issued in International Application No. PCT/US2013/070268 vol/Iss: pp. 1-10 dated Mar. 6, 2014.

Author: Hosseini, R. Title: Office Action issued in copending U.S. Appl. No. 13/600,194, filed Aug. 30, 2012 Publ: vol/Iss: pp. 1-35 dated Feb. 11, 2014.

International Search Report and Written Opinion dated Apr. 24, 2014, issued in a corresponding International Application No. PCT/US2013/077972 filed Dec. 27, 2013.

Boccio, "Office Action issued in co-pending U.S. Appl. No. 13/680,005, filed Nov. 16, 2012", dated Dec. 3, 2014, 1-13.

Byun, "International Search Report and Written Opinion issued in International Application No. PCT/US2013/070268", dated Mar. 6, 2014, 1-10.

Civan, "Office Action issued in co-pending U.S. Appl. No. 13/475,083, filed May 18, 2012", dated Jan. 16, 2013, 1-11.

Civan, "Office Action issued in co-pending U.S. Appl. No. 13/475,083, filed May 18, 2012", dated Sep. 4, 2012, 1-11.

Heller, "Efficient Bayesian Methods for Clustering", Thesis, University College London—Gatsby Computational Neuroscience Unit, 2007, 1-120.

Hosseini, "Office Action issued in co-pending U.S. Appl. No. 13/600,194, filed Aug. 30, 2012", dated Feb. 11, 2014, 1-35.

Hosseini, "Office Action issued in co-pending U.S. Appl. No. 13/600,194, filed Aug. 30, 2012", dated Aug. 25, 2014, 1-37.

Sato, et al., "Bayesian Document Generative Model with Explicit Multiple Topics", Proceedings of the 2007 Joint Conference on Empirical Methods in Natural Language Processing and Computational Natural Language Learning, Prague, Jun. 2007, 421-429.

Unknown, "amazon.com, Product Details and Reviews for Movie The Time Traveler's Wife (2009)", Amazon.com, [online] [retrieved from the internet] <URL:www.amazon.com/Time-Travelers-Wife-Rachel-McAdams/dp/B001HN69C2/ref=sr_1_1?le=UTF8&qid= . . . >., 2009, 1-6.

Unknown, "Proquest—Search Results", Proquest.com [online] [retrieved from the internet] <URL://search.proquest.com/results/14346FA16711B7DB84E/1/$5bqueryType$3dcommand . . . >, Jan. 29, 2014, 1-2.

Unknown, "Text Classification and Naive Bayes", Cambridge University Press, [online][retrieved from the internet] <URL:http://nlp.stanford.edu/IR-book/html/htmledition/text-classification-and-naive-bayes-1.html>., 2008, 1-3.

Unkown, "Naive Bayesian for Topic Detection Using "Bag of Words" Approach", Stackoverflow.com [online][retrieved from the internet] <URL:http://stackoverflow.com/questions/2781752/naive-bayesian-for-topic-detection-using-bag-of-words-approach>., 2012, 1-2.

Uszkoreit, et al., "Distributed Word Clustering for Large Scale Class-Based Language Modeling in Machine Translation", Google, Inc,, 2008, 1-8.

Weng, et al., "Applying Bayesian Network and Association Rule Analysis for Product Recommendations", International Journal of Electronic Business Management, vol. 9, No. 2, 2011, 149-159.

Boccio, "Office Action issued in copending U.S. Appl. No. 13/680,005, filed Nov. 16, 2012", dated May 13, 2015, 1-16.

Baharlou, "International Preliminary Report on Patentability issued in International Application No. PCT/US2013/070268", dated May 28, 2015, 7 pages.

Baharlou, "International Preliminary Report on Patentability issued in International Application No. PCT/US2013/077972", dated Jul. 9, 2015, 6 pages.

\* cited by examiner

DETECTING PRODUCT LINES WITHIN PRODUCT SEARCH QUERIES

TECHNICAL FIELD

The present disclosure relates to systems and methods for determining terms within product search queries that designate product lines, and more specifically with pairing the detected product lines with product brands.

BACKGROUND

Users frequently perform Internet search queries for products being offered for sale. As part of understanding the user intent of shopping-related search queries, it is important for product search engines to understand various aspects of product categories. For example, most products are associated with a brand. As another example, most digital cameras have a specified number of megapixels. An important product aspect that can change over time, sometimes rapidly, is the product line. Companies introduce new product lines and retire old ones quite frequently. There is a need in the art to automatically detect terms designating product lines from within product queries provided by search users. There is a further need to associate the detected product line terms with their corresponding brands to keep up with recognizing new product lines and retiring old product lines soon after changes occur.

SUMMARY

In certain example embodiments described herein, methods and systems can determine product lines from product search queries. A product query of search terms may be received from a user. The product query may be classified to identify a product category. A brand may be identified for the product query. The brand may be selected from a list of known brands for the product category. One or more unknown product line terms may be identified within the product query. A metric may be computed to indicate how well the unknown product line terms correspond to an actual product line within the brand. The metric may be compared to a specified threshold. The unknown product line terms may be designated as a new product line of the brand if the metric favorably compares to the specified threshold. A product search may be performed using the product query. Product search results may be returned according to the product search.

These and other aspects, objects, features, and advantages of the example embodiments will become apparent to those having ordinary skill in the art upon consideration of the following detailed description of illustrated example embodiments.

DETAILED DESCRIPTION OF EXAMPLE EMBODIMENTS

Overview

The methods and systems described herein enable determining product lines from product search queries. Product search queries may be received from users via a network such as the Internet. Product lines associated with product brands may be determined from analyzing the received product search queries.

Using a high-precision query classifier, a search query may be automatically mapped to a product category. A list of known brands within the product category may be used to identify terms within the product query specifying the product brand. Similarly, a list of known category attributes may be used to identify terms within the product query specifying attributes of the product being searched. Examples of attributes may include a number of megapixels for digital cameras, an amount of RAM memory for laptop computers, or a number of cylinders for a motor vehicle.

Among various other possible forms, a product query may take the form "[B] [PL] [A]." In such a query form, one or more terms [B] may indicate a brand that is a known brand within a list of known product brands, and one or more terms [A] may indicate attributes that are known attributes of the category. One or more unknown terms [PL] may then be identified as a potential new product line. Such an identification may be strengthened where [PL] is in a form associated with product lines. The identification may also be strengthened where [PL] is found with brand [B] frequently over time within various product queries 120. The identification may be further strengthened where the terms [PL] are infrequently, or never, found with brands other than the brand [B] throughout many product queries over time.

A metric may be computed for how well the potential new product line terms fit an actual likely product line associated with the brand. The metric may consider the number of unique product queries containing the terms [PL] having the correct structure and/or category along with the extent to which [B] dominates among every query that has a brand preceding [PL]. The computed metric can then be compared to a pairing threshold. When the computed metric is greater than the pairing threshold, the terms [PL] may be determined as a new product line for the brand [B]. Thus, a product line brand pairing ([PL]-[B] pairing) may be formed.

The functionality of the various example embodiments will be explained in more detail in the following description, read in conjunction with the figures illustrating the program flow. Turning now to the drawings, in which like numerals indicate like (but not necessarily identical) elements throughout the figures, example embodiments are described in detail.

Example System Architectures

Figure 1:
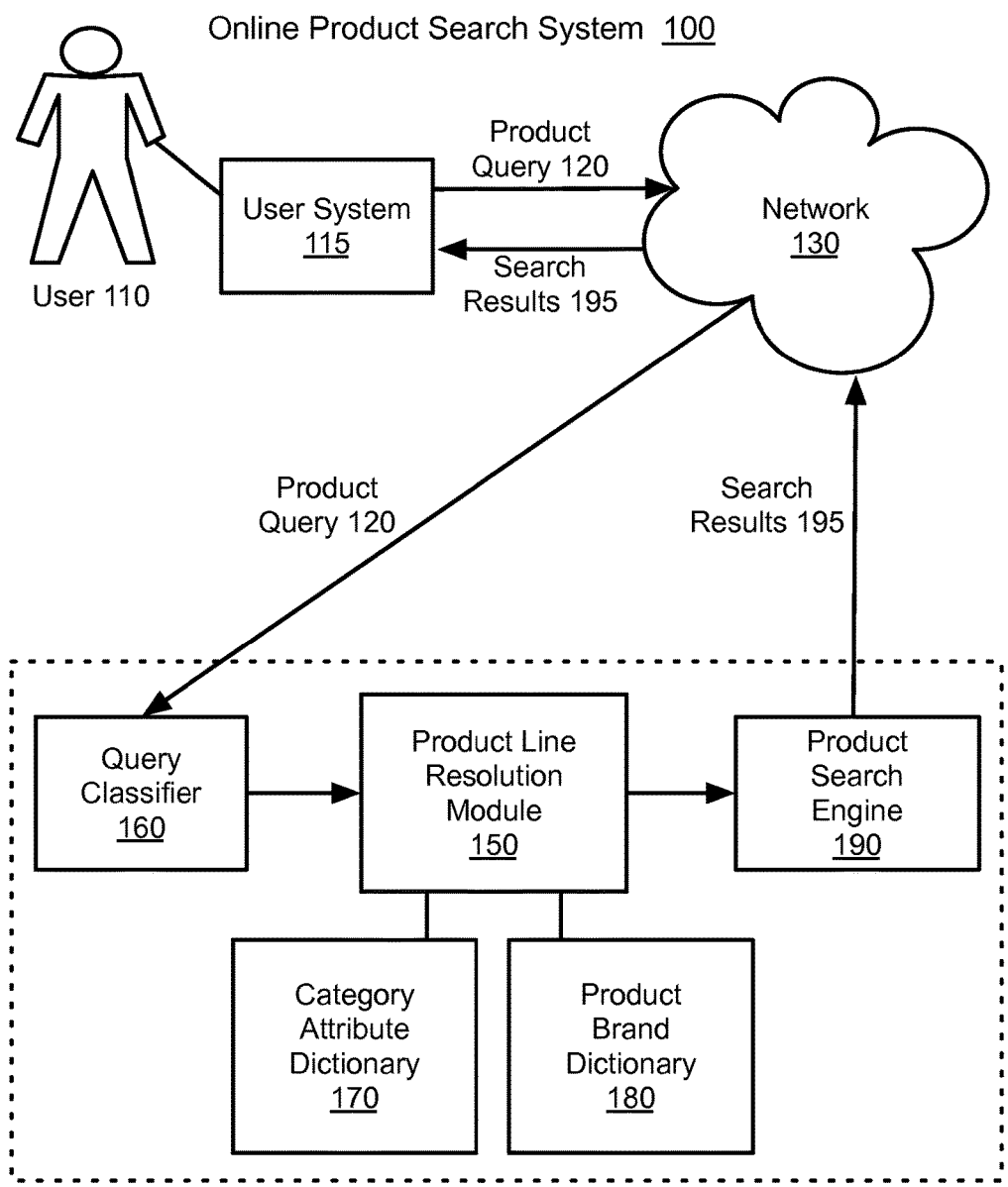
FIG. 1 is a block diagram depicting an online product search system in accordance with one or more example embodiments presented herein.

FIG. 1 is a block diagram depicting an online product search system 100 in accordance with one or more example embodiments presented herein. Within the online product search system 100, a user 110 can issue a product query 120 from a user system 115 to a query classifier 160 via a network 130. The query classifier 160 can map the query to a product category to be provided to a product line resolution module 150. The product line resolution module 150 can identify product lines associated with brands for product categories determined by the query classifier 160. The product line resolution module 150 may leverage a category attribute dictionary 170 and a product brand dictionary 180 to improve the resolution of product lines and establish pairings between brands and product lines. The product query 120 and the determined brands and product lines may then be provided to a product search engine 190. The product search engine 190 may then provide search results 195 to the user 110 at the user system 115 via the network 130.

The query classifier 160 may be used to map the product query 120 to a product category. The product line resolution module 150 can leverage that product category information along with information from the category attribute dictionary 170 and the product brand dictionary 180 to identify terms within the product query 120 that relate to product lines. The product lines identified by the product line resolution module 150 for a category may be fed back into the category attribute dictionary 170 as attributes for that category. Each identified product line may also be related to a particular brand listed in the product brand dictionary 180.

The product brand dictionary 180 can provide a list of known brands within various product categories. The known brands may be leveraged to determine and resolve terms associated with product lines within each brand. For example, a product query 120 of the form "[B] [PL]" may include one or more terms [B] indicating a brand that is a known brand within the product brand dictionary 180. The one or more terms [PL] may then be identified as a potential new product line. Such an identification may be strengthened where [PL] is in a form associated with product lines. The identification may also be strengthened where [PL] is found with brand [B] frequently over time within various product queries 120. The identification may be further strengthened where the terms [PL] are infrequently, or never, found with brands other than the brand [B] throughout many product queries 120 over time.

Various conditions may be specified for determining when [PL] is in a form associated with product lines. For example, it may have been observed that product line terms generally start with a letter. Also, it may have been observed that product lines generally contain few or no numbers. In these examples, such specified forms of product lines can help to differentiate product line terms from model numbers or serial numbers. According to certain other examples, the form of potential product lines may be related to a category or a brand. For example, one brand may generally have single word product lines while a second brand may use two word product lines where the first word relates to performance and the second word is a three-digit number. Whatever patterns or forms have been learned or specified for product lines may be used to improve the likelihood that unknown terms within a product query 120 can be identified as product line terms or not.

The category attribute dictionary 170 can provide a dictionary of attributes associated with various product categories and brands. Terms from the category attribute dictionary 170 may be applied to resolving product line terms within the product query 120. For example, a product query 120 may have the form "[B] [PL] [A]" where [B] is one or more terms indicating a known brand within the product brand dictionary 180, and [A] is one or more terms indicating attributes that are known within the category attribute dictionary 170 as being associated with the relevant category and/or brand. When [PL] is consistently found within product queries 120 along with [B], it may be possible to identify [PL] as product line terms associated with the brand [B]. This identification may be strengthened when known attribute terms [A] are found within the category attribute dictionary 170 to be consistent with brand [B] or the category associated with the product query 120 by the query classifier 160.

Similarly, a product query 120 may have the form "[B] [PL] [C]" where [B] is a known brand within the product brand dictionary 180 and [C] is a category term consistent with the category associated with the product query 120 by the query classifier 160. In such an instance, or a hybrid instance having terms for both [C] and [A] within the product query 120, consistent isolation and matching of terms [PL] can imply an identification of [PL] as a product line associated with the brand [B] and or the relevant product category.

The product search engine 190 can use the product query 120 along with an identified pairing between a product line and a brand within the product query 120 to identify search results 195. The product search engine 190 may comprise various search index techniques. The product search engine 190 may also leverage product or shopping search techniques. The search results 195 may be presented to the user 110 at a user system 115 within a web browser or other application software. According to one or more example embodiments, example search results 195 are presented in further detail with respect to FIG. 2.

Figure 4:
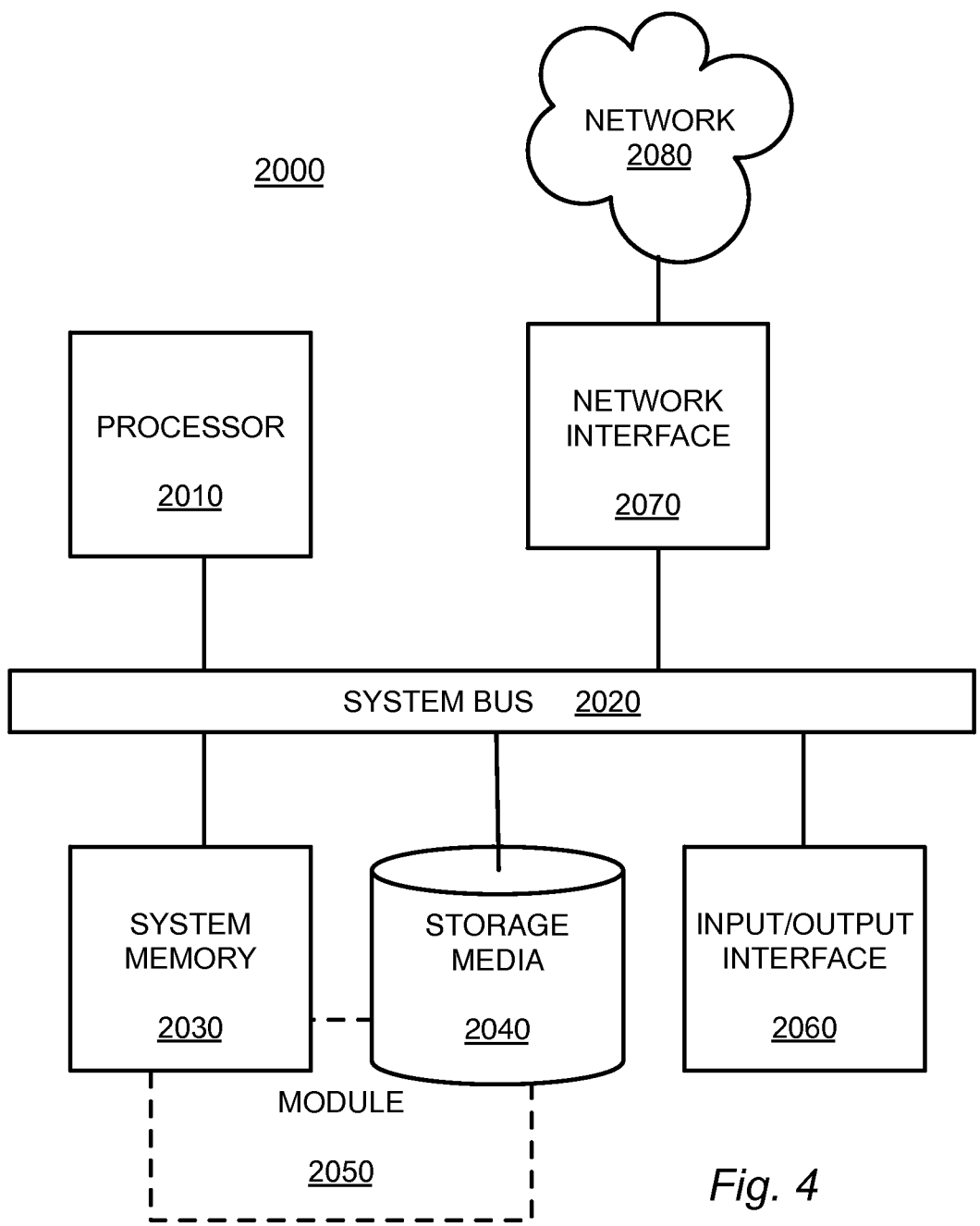
FIG. 4 is a block diagram depicting a computing machine and a module in accordance with one or more example embodiments presented herein.

The user system 115, one or more systems associated with the query classifier 160, the product line resolution module 150, the product search engine 190, or any other computing machines associated with this technology may be any type of computing machine such as, but not limited to, those discussed in more detail with respect to FIG. 4. Furthermore, any modules associated with any of these computing machines or any other modules (scripts, web content, software, firmware, or hardware) associated with the technology presented herein may by any of the modules discussed in more detail with respect to FIG. 4. The computing machines discussed herein may communicate with one another as well as other computer machines or communication systems over one or more networks such as network 130. The network 130 may include any type of data or communications network, including any of the network technology discussed with respect to FIG. 4.

Figure 2:
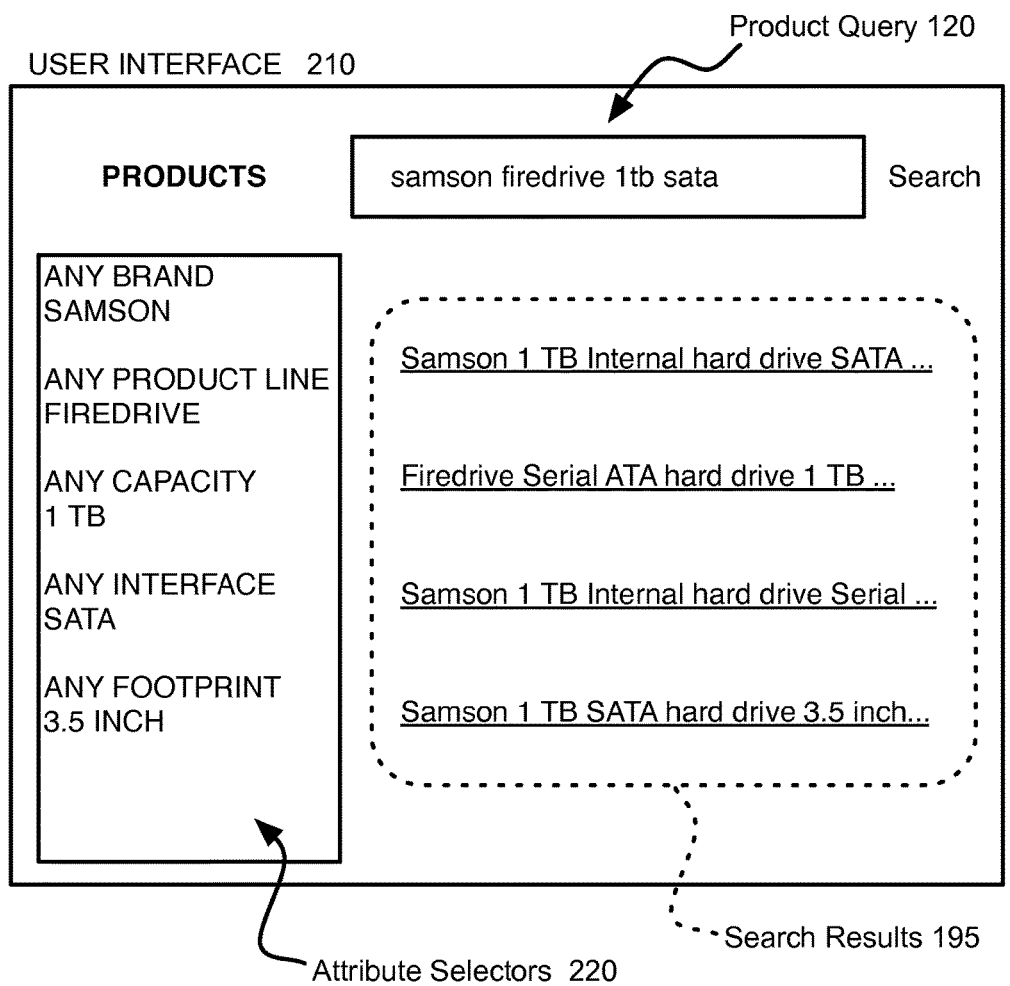
FIG. 2 is a user interface diagram depicting a browser interface for product queries and search results in accordance with one or more example embodiments presented herein.

FIG. 2 is a user interface diagram depicting a browser interface for product queries 120 and search results 195 in accordance with one or more example embodiments presented herein. The user interface 210 can provide an input mechanism for the user 110 to enter a product query 120. The user interface 210 can provide a list of search results 195 from the online product search system 100. A set of attribute selectors 220 may be included within the user interface 210 to allow the user 110 to narrow or redirect the search results 195 onto products with specific product attributes potentially including brands and/or product lines.

The user interface 210 may be rendered as content to be presented to a browser or other software application. Such a browser or software application may be configured to execute upon the user system 115. As such, the user interface 210 may be presented to, and/or interacted upon by, the user 110 at a user system 115.

The attribute selectors 220 may be included within the user interface 210 to allow the user 110 to narrow or redirect the search results 195 onto products with specific product attributes. The attributes may include brands and/or product lines. The attributes may be populated within the attribute selectors 220 according to the determined brand or product line for the product query 120.

In the illustrated example, the fictional product query 120 is for "Samson firedrive 1 tb sata." The query classifier 160 may identify the category of hard drives from the example product query 120. The product line resolution module 150 may identify "Samson" as a hard drive brand from the product brand dictionary 180. The product line resolution module 150 may identify "1 TB" and "SATA" as attributes for the category (hard drives) from the category attribute dictionary 170. If "FireDrive" were not already know as a product line of Samson hard drives, the product line resolution module 150 may identify "firedrive" as an unknown product line term of the example product query 120. The unknown product line term "firedrive" from the example product query 120 may then be used as evidence that "FireDrive" is a product line, perhaps newly introduced. This new product line identification may be strengthened if "FireDrive" were in the form of a product line name or even a product line name common to the brand Samson as discussed above. The new product line identification may be further strengthened if "FireDrive" were found repeatedly with the brand "Samson" (and perhaps very infrequently with other brands) in product queries 120 for hard drives. These indicators can also provide support for the pairing of the new product line "FireDrive" with the brand "Samson."

Example Processes

Figure 3:
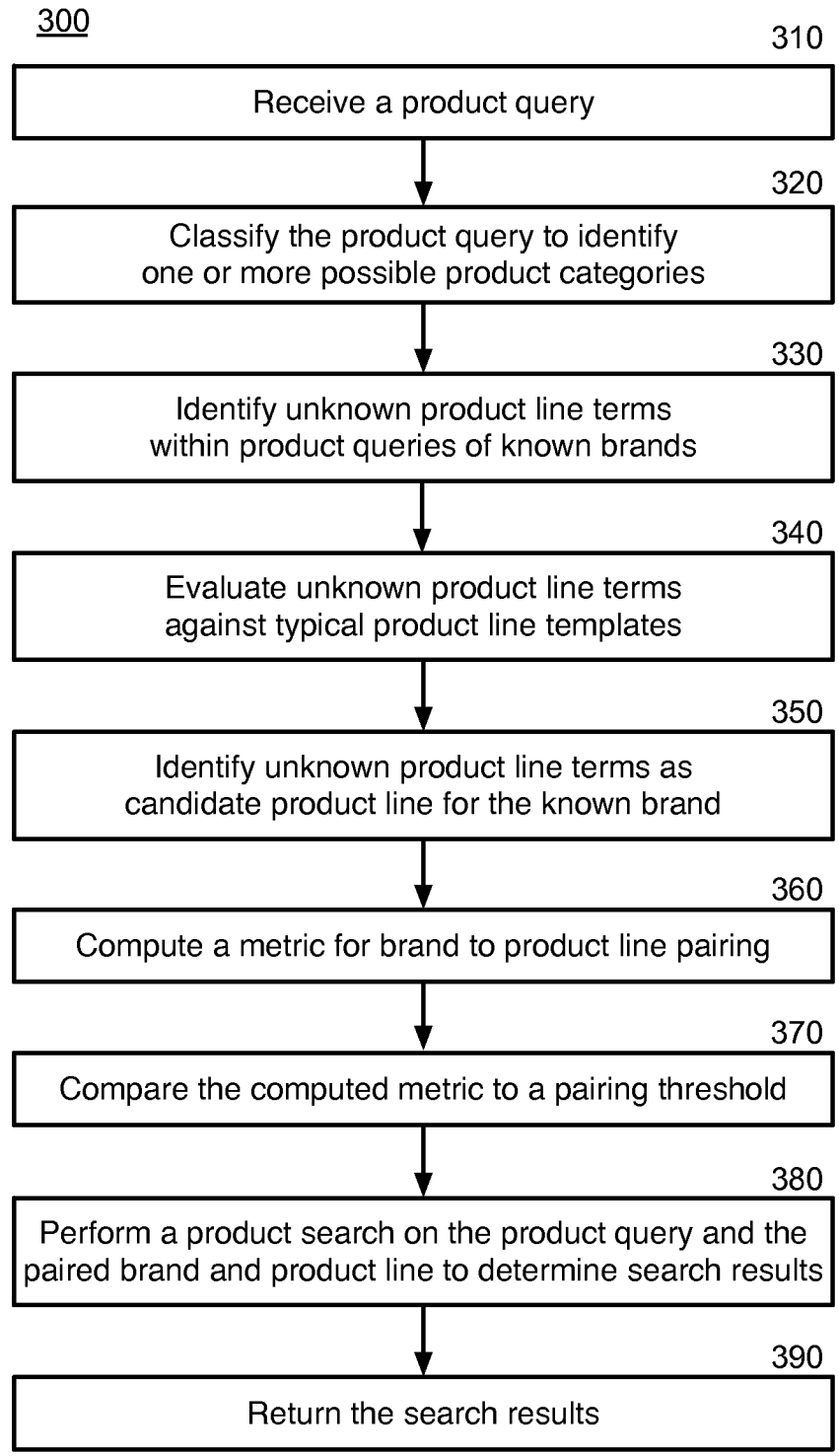
FIG. 3 is a block flow diagram depicting a method for determining product lines from user queries in accordance with one or more example embodiments presented herein.

FIG. 3 is a block flow diagram depicting a method 300 for determining product lines from user queries in accordance with certain exemplary embodiments.

In block 310, the online product search system 100 can receive a product query 120 from a user 110 associated with a user system 115. The product query 120 can include terms associated with one or more products being searched by the user 110.

In block 320, a query classifier 160 may be used to map the product query 120 to a product category. Generally, the set of search terms making up the product query 120 may be mapped to a category that covers the set of terms.

In block 330, a product line resolution module 150 can identify unknown product line terms within product queries of known brands. For example, from a product query 120 having the form "[B] [PL] [A]" where [B] has been identified as a known brand within the product brand dictionary 180 and [A] has been identified as one or more known attributes within the category attribute dictionary 170, the product line resolution module 150 may identify [PL] as one or more unknown product line terms.

In block 340, the product line resolution module 150 can evaluate the unknown product line terms against typical product line templates. The one or more terms [PL] as identified in block 330 may be evaluated to be of the form of a product line. The form may be of a product line in general, a product line within the category, a product line associated with the brand [B], or a product line associated with the one or more product attributes [A]. The form may be specified as a template, a rule, a pattern, or in any other useful fashion. An example of a rule or pattern may be that product line terms generally start with a letter and contain few or no numbers.

In block 350, the product line resolution module 150 can identify unknown product line terms as a candidate product line for the known brand. If the one or more terms [PL] as identified in block 330 appear frequently next to brand [B], and also in isolation (without the brand [B]), but rarely (if ever) adjacent to any other brand, then the terms [PL] may be identified as a product line candidate for the brand [B].

In block 360, the product line resolution module 150 can compute a metric for brand to product line pairing. The metric may be a function of the number of unique product queries 120 that have the one or more terms [PL] supported in forms such as "[B] [PL]," "[B] [PL] [A]," "[PL] [A]," or so forth. The metric may be a function of how frequently such product queries 120 are identified as the appropriate category for example to correspond to [B] and/or [A]. The metric may be a function of the total volume of such product queries 120 since popular queries may be issued multiple times. The metric may be a function of the extent to which [B] dominates among every query that has a brand preceding [PL]. The metric may be normalized to be a function of the fraction of product queries 120 in which [PL] appears in the above forms out of all occurrences of [PL]. Various combinations of these and other functions may also be used.

In block 370, the product line resolution module 150 can compare the computed metric to a pairing threshold. When the computed metric is greater than the pairing threshold, the terms [PL] may be determined as a new product line for the brand [B]. Thus, a product line brand pairing ([PL]-[B] pairing) may be formed. The new product like terms [PL] may also be added to the category attribute dictionary 170. In example embodiments, the threshold can be established to provide a desired accuracy. A higher threshold will provide a greater certainty that the terms [PL] may be determined as a new product line for the brand [B], compared to a lower threshold.

In block 380, the product search engine 190 can process the product query 120 to identify search results 195. The search engine 190 may also leverage the identified product line or product line brand pairing to refine the search results 195.

In block 390, the online product search system 100 can return search results 195 to the user 110 at a user system 115 via the network 130. The search results 195 may be presented to the user 110 at a user system 115 within a web browser or other application software.

Example Systems

FIG. 4 depicts a computing machine 2000 and a module 2050 in accordance with one or more embodiments presented herein. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 also may include volatile memories, such as random access memory ("RAM"), static random access memory ("SRAM"), dynamic random access memory ("DRAM"), and synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid sate drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attachment ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, biometric readers, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks ("WAN"), local area networks ("LAN"), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to some embodiments, any of the processor 2010, the other elements of the computing machine 2000, or the various peripherals discussed herein may be integrated into a single device such as a system on chip ("SOC"), system on package ("SOP"), or ASIC device.

In situations in which the systems discussed here collect personal information about users, or may make use of personal information, the users may be provided with a opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

One or more aspects of embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the invention should not be construed as limited to any one set of computer program instructions. Further, a skilled programmer would be able to write such a computer program to implement an embodiment of the disclosed invention based on the appended flow charts and associated description in the application text. Therefore, disclosure of a particular set of program code instructions is not considered necessary for an adequate understanding of how to make and use the invention. Further, those skilled in the art will appreciate that one or more aspects of the invention described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays ("FPGA"), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of embodiments of the invention. Accordingly, such alternative embodiments are included in the inventions described herein.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of the invention defined in the following claims, the scope of which is to be accorded the broadest interpretation so as to encompass such modifications and equivalent structures.

What is claimed is:

1. A computer-implemented method to determine new product lines from unknown search terms in product searches, comprising:
    receiving, using one or more computing devices, a first product query comprising first search terms;
    classifying, using the one or more computing devices, the first product query to identify a product category for the first product query;
    identifying, using the one or more computing devices, a brand corresponding to the first product query, the brand being selected from a list of known brands for the product category and being based on one or more of the first search terms;
    retrieving, using the one or more computing devices, a known attribute list for the product category;
    identifying, using the one or more computing devices, one or more unknown terms within the first product query that do not correspond to the known attribute list for the product category;
    classifying, using the one or more computing devices, the one or more unknown terms not corresponding to the known attribute list as unknown product line terms based on comparing the one or more terms against known product line templates comprising known product lines corresponding to known brands;
    computing, using the one or more computing devices, a metric indicating a correspondence of the unknown product line terms to an actual product line within the brand, wherein computing the metric comprises determining a total number of other product queries comprising the unknown product line terms;
    determining, using the one or more computing devices, that the metric exceeds a predefined threshold;
    designating, using the one or more computing devices, the unknown product line terms as a new product line for the brand in response to determining that the metric exceeds the specified threshold;
    performing, using the one or more computing devices, a product search for the new product line using the first product query to obtain first search results;
    refining, using the one or more computing devices, the first search results based on the new product line to obtain second search results; and
    returning, using the one or more computing devices, search results according to the product search for the new product line.

2. The computer-implemented method of claim 1, wherein computing the metric further comprises determining one or more frequencies in which other product queries comprise both the unknown product line terms and terms associated with the brand.

3. The computer-implemented method of claim 1, wherein computing the metric further comprises determining one or more frequencies in which other product queries comprise both the unknown product line terms and terms associated with brands other than the brand.

4. The computer-implemented method of claim 1, wherein computing the metric further comprises evaluating each of the unknown product line terms for a similarity to known product lines associated with the brand.

5. The computer-implemented method of claim 1, wherein computing the metric further comprises evaluating the unknown product line terms for typical product line term patterns.

6. The computer-implemented method of claim 1, wherein computing the metric further comprises evaluating each of the unknown product line terms for a similarity to known product lines associated with the brand.

7. The computer-implemented method of claim 1, wherein the search results comprise one or more links to one or more products.

8. The computer-implemented method of claim 1, wherein computing the metric further comprises evaluating the unknown product line terms for typical product line term patterns.

9. A system to determine new product lines from unknown search terms in product searches, comprising:
   one or more computing devices that are configured to:
      receive a first product query comprising first search terms;
      classify the first product query to identify a product category for the first product query;
      identify a brand corresponding to the first product query, the brand being selected from a list of known brands for the product category and being based on one or more of the first search terms;
      retrieve a known attribute list for the product category;
      identify one or more unknown terms within the first product query that do not correspond to the known attribute list for the product category;
      classify the one or more unknown terms not corresponding to the known attribute list as unknown product line terms based on comparing the one or more terms against known product line templates comprising known product lines corresponding to known brands;
      compute a metric indicating a correspondence of the unknown product line terms to an actual product line within the brand, wherein computing the metric comprises determining a total number of other product queries comprising the unknown product line terms;
      determine that the metric exceeds a predefined threshold;
      designate the unknown product line terms as a new product line for the brand in response to determining that the metric exceeds the predefined threshold;
      perform a product search for the new product line using the first product query to obtain first search results;
      refine the first search results based on the new product line to obtain second search results; and
      return second search results according to the product search for the new product line.

10. The system of claim 9, wherein computing the metric further comprises determining a total number of other product queries comprising the unknown product line terms.

11. The system of claim 9, wherein computing the metric further comprises determining one or more frequencies in which other product queries comprise both the unknown product line terms and terms associated with the brand.

12. The system of claim 9, wherein computing the metric further comprises evaluating each of the unknown product line terms for a similarity to known product lines associated with the brand.

13. The system of claim 9, wherein the search results comprise one or more links to one or more products.

14. The system of claim 9, wherein computing the metric further comprises determining one or more frequencies in which other product queries comprise both the unknown product line terms and terms associated with brands other than the brand.

15. The system of claim 9, wherein computing the metric further comprises evaluating each of the unknown product line terms for a similarity to known product lines associated with the brand.

16. The system of claim 9, wherein computing the metric further comprises evaluating the unknown product line terms for typical product line term patterns.

17. A computer program product to determine new product lines from unknown search terms in product searches, comprising:
   a non-transitory computer-readable medium having computer-executable program instructions embodied thereon that, when executed by one or more computing devices, cause the one or more computing devices to:
      receive a first product query comprising first search terms;
      classify the first product query to identify a product category for the first product query;
      identify a brand corresponding to the first product query, the brand being selected from a list of known brands for the product category and being based on one or more of the first search terms;
      retrieve a known attribute list for the product category;
      identify one or more unknown product line terms within the first product query that do not correspond to the known attribute list for the product category;
      classify the one or more unknown terms not corresponding to the known attribute list as unknown product line terms based on comparing the one or more terms against known product line templates comprising known product lines corresponding to known brands;
      compute a metric indicating a correspondence of the unknown product line terms to an actual product line within the brand, wherein computing the metric comprises determining a total number of other product queries comprising the unknown product line terms;
      determine that the metric exceeds a predefined threshold;
      designate the unknown product line terms as a new product line for the brand in response to determining that the metric exceeds the predefined threshold;
      perform a product search for the new product line to obtain first search results;
      refine the search results based on the new product line to obtain second search results; and
      return search results according to the product search for the new product line.

18. The computer program product of claim 17, wherein computing the metric further comprises evaluating the unknown product line terms for typical product line term patterns.

19. The computer program product of claim 17, wherein computing the metric further comprises determining a total number of other product queries comprising the unknown product line terms.

20. The computer program product of claim 17, wherein computing the metric further comprises determining one or more frequencies in which other product queries comprise both the unknown product line terms and terms associated with the brand.

* * * * *